(12) United States Patent
Sato et al.

(10) Patent No.: US 8,864,919 B2
(45) Date of Patent: Oct. 21, 2014

(54) NICKEL BASED FORGED ALLOY, GAS TURBINE MEMBER USING SAID ALLOY AND GAS TURBINE USING SAID MEMBER

(71) Applicant: Hitachi, Ltd., Tokyo (JP)

(72) Inventors: Jun Sato, Hitachi (JP); Shinya Imano, Hitachi (JP); Hiroyuki Doi, Tokai-mura (JP); Takashi Shibayama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 10 days.

(21) Appl. No.: 13/722,505

(22) Filed: Dec. 20, 2012

(65) Prior Publication Data

US 2013/0160466 A1    Jun. 27, 2013

(30) Foreign Application Priority Data

Dec. 22, 2011  (JP) .................................. 2011-280690

(51) Int. Cl.
  *C22C 19/05*  (2006.01)
(52) U.S. Cl.
  USPC .......................................... 148/428; 420/448
(58) Field of Classification Search
  CPC ............................ C22C 19/056; C22C 19/055
  USPC .......................................... 420/448; 148/428
  See application file for complete search history.

(56) References Cited

U.S. PATENT DOCUMENTS

| 2008/0179033 A1 | 7/2008 | Forbes Jones |
| 2010/0310411 A1 | 12/2010 | Ohsaki et al. |
| 2012/0141293 A1 | 6/2012 | Sato et al. |

FOREIGN PATENT DOCUMENTS

| EP | 2 246 449 A1 | 11/2010 |
| EP | 2 479 302 A1 | 7/2012 |
| JP | 4-280938 A | 10/1992 |
| JP | 2008-179845 A | 8/2008 |
| JP | 2012-117122 A | 6/2012 |

OTHER PUBLICATIONS

Japanese Notice of Allowance dated Jan. 14, 2014 with partial English translation (four (4) pages).
Fu et al., "Research on Inconel 718 Type Alloys with Improvement of Temperature Capability", $7^{th}$ International Symposium on Superalloy 718 and Derivatives, TMS, 2010, p. 281-296.
European Search Report Dated Jun. 10, 2013 {Five (5) Pages}.

*Primary Examiner* — Jesse Roe
(74) *Attorney, Agent, or Firm* — Crowell & Moring LLP

(57) ABSTRACT

It is an objective of the invention to provide a Ni-based forged alloy having good large ingot formability and good hot formability as well as high mechanical strength at high temperature. There is provided a Ni-based forged alloy comprising: 0.001 to 0.1 mass % of C; 0.001 to 0.01 mass % of B; 16 to 22 mass % of Cr; 0.5 to 1.5 mass % of Al; 0.1 to 6.0 mass % of W; 3.5 to 5.5 mass % of Nb; 0.8 to 3.0 mass % of Ti; 16 to 20 mass % of Fe; 2.0 mass % or less of Mo; and the balance including Ni and unavoidable impurities, in which: a segregation parameter Ps defined by a formula of "Ps (mass %) = 1.05×[Al concentration (mass %)]+0.6×[Ti concentration (mass %)]−0.8×[Nb concentration (mass %)]−0.3×[Mo concentration (mass %)]" satisfies a relationship of "Ps≥−3.0 mass %"; and a total amount of W and Mo is 1.75 atomic % or less.

10 Claims, 2 Drawing Sheets

NICKEL BASED FORGED ALLOY, GAS TURBINE MEMBER USING SAID ALLOY AND GAS TURBINE USING SAID MEMBER

CLAIM OF PRIORITY

The present application claims priority from Japanese patent application serial no. 2011-280690 filed on Dec. 22, 2011, the content of which is hereby incorporated by reference into this application.

BACKGROUND OF THE INVENTION

1. Field of the Invention

The present invention relates to nickel (Ni)-based heat-resistant alloys, and particularly to Ni-based forged alloys suitable for large members. The invention also relates to gas turbine members formed using the above Ni-based forged alloy of the invention and a gas turbine constructed using such gas turbine members of the invention.

2. Description of Related Art

An effective way to increase the efficiency of gas turbines is to increase their combustion temperature. So, many of the small parts and large members of gas turbines are made of an Ni-based heat-resistant alloy having superior high-temperature mechanical strength. Such an Ni-based heat-resistant alloy contains a high proportion of solid-solution strengthening elements (such as tungsten (W), molybdenum (Mo) and cobalt (Co)) and precipitation strengthening elements (such as aluminum (Al), titanium (Ti), niobium (Ni) and tantalum (Ta)).

A foremost precipitation strengthening phase is γ' (gamma prime) phase ($Ni_3Al$ phase), which has a peculiar property in that its mechanical strength increases with increasing temperature. Thus, γ' phase is extremely effective in improving the high-temperature mechanical characteristics of Ni-based alloys. The addition of elements such as Ti, Nb and Ta has been found to stabilize γ' phase and allow γ' phase to remain up to higher temperature. Based on this knowledge, the development of high performance Ni-based alloys has been conventionally focused on the stabilization of γ' phase.

On the other hand, these elements such as Ti, Nb and Ta are prone to segregate during the solidification of large ingots, resulting in an inability to form large members. Thus, conventionally, the application of high-strength Ni-based alloys to turbines has been confined to relatively small turbine members such as rotor blades and stator vanes.

It is known that alloy 718 is a high-strength Ni-based alloy that can be used to form relatively large turbine members. For example, JP-A Hei 4 (1992)-280938 discloses a method for casting an Ni-based superalloy (such as alloy 718) having a composition within a specified range, in which the relationship of "G/R≥0.5 (° C.·h/$cm^2$)" is satisfied, where R (cm/h) is a solidification rate of a melt of the Ni-based superalloy during casting and G (° C./cm) is a temperature gradient across a solidification interface. According to JP-A Hei 4 (1992)-280938, such control of the solidification rate and the temperature gradient can reduce solidification segregation, resulting in an improvement in ductility of the Ni-based superalloy.

JP-A 2008-179845 discloses a structural member made of a superalloy comprising a superalloy matrix and several types of hard nanoparticles dispersed along grain boundaries of the superalloy matrix, wherein the content of the hard nanoparticles in the superalloy structural member is from about 1 to about 30 vol. %. The superalloy structural member is formed by thermomechanically processing the superalloy matrix and the hard nanoparticles. According to JP-A 2008-179845, the superalloy structural member has an increased high-temperature stability, and thus has an increased strength and an increased fatigue strength.

Fu et al. report an improved 718 alloy obtained by compositional adjustment, wherein the improved 718 alloy contains micro-precipitation phases (γ' phase and γ" phase) and a new type stable spherical precipitation phase different from δ (delta) phase of conventional 718 alloys, the new type precipitation phase precipitating along grain boundaries of the improved 718 alloy (see Shuhong Fu, Jianxin Dong, Maicang Zhang, Ning Wang, and Xishan Xie: "Research on Inconel 718 Type Alloys with Improvement of Temperature Capability", 7th International Symposium on Superalloy 718 and Derivatives, TMS, 2010). According to Fu et al., the improved 718 alloy has a longer stress rupture life and higher fatigue resistance than conventional 718 alloys.

As described before, a problem is that larger members are more difficult to manufacture by casting and forming. For example, it is probably difficult to maintain the solidification conditions described in JP-A Hei 4 (1992)-280938 uniformly throughout the entire volume of a large member of heavier than 5 tons.

Another problem is as follows: A product made of Ni-based heat-resistant alloys are forged or rolled at conventional high temperatures. In addition, an extremely large forming load is required to forge or roll a high-strength material into a large product. Therefore, large members of a high-strength material are forged or rolled at higher-than-conventional temperatures in order to reduce the deformation resistance of the high-strength material. However, frequent or incessant heating is required to maintain such a higher forming temperature, thus consuming longer processing time and larger heating energy. Also, a high-strength material is more likely to suffer from cracking during such higher temperature processing due to partial melting thereof. In terms of formability and processability, the technologies of JP-A 2008-179845 and Fu et al. may have the disadvantage of poor hot forgeability.

As described above, there is a tradeoff between the mechanical strength properties and the manufacturability (such as large ingot formability and hot formability) of Ni-based heat resistant alloys. As described, in order to increase the efficiency of gas turbines, large-size turbine members having a high-temperature mechanical strength are required. Thus, a strong demand exists for high-temperature materials having improved large ingot formability and improved hot formability.

SUMMARY OF THE INVENTION

In view of foregoing, it is an objective of the present invention to solve the above problems and to provide an Ni-based forged alloy having good large ingot formability and good hot formability as well as high mechanical strength at high temperature. Furthermore, it is another objective of the present invention to provide gas turbine members formed using the above Ni-based forged alloy of the invention and a gas turbine constructed using such gas turbine members of the invention.

(I) According to one aspect of the present invention, there is provided an Ni-based forged alloy comprising: 0.001 to 0.1 mass % of C; 0.001 to 0.01 mass % of B; 16 to 22 mass % of Cr; 0.5 to 1.5 mass % of Al; 0.1 to 6.0 mass % of W; 3.5 to 5.5 mass % of Nb; 0.8 to 3.0 mass % of Ti; 16 to 20 mass % of Fe; 2.0 mass % or less of Mo; and the balance including Ni and unavoidable impurities, in which: a segregation parameter Ps defined by a formula of "Ps (mass %)=1.05×[Al concentration (mass %)]+0.6×[Ti concentration (mass %)]−0.8×[Nb concentration (mass %)]−0.3×[Mo concentration (mass %)]" satisfies a relationship of "Ps≥−3.0 mass %"; and total amount of W and Mo is 1.75 atomic % or less.

In the above aspect (I) of the invention, the following modifications and changes can be made.

(i) The Ni-based forged alloy further comprises at least one additional element selected from a group consisting of 5 mass % or less of Co, 0.1 mass % or less of Mg, 0.1 mass % or less of Ca, 0.1 mass % or less of Zr, 0.5 mass % or less of Mn, 0.5 mass % or less of Si, 0.5 mass % or less of V, 0.5 mass % or less of Ta, and 0.5 mass % or less of Re.

(ii) In the Ni-based forged alloy, the content of C is from 0.03 to 0.08 mass %; the content of B is from 0.003 to 0.008 mass %; the content of Cr is from 18 to 20 mass %; the content of Al is from 0.6 to 1.3 mass %; the content of W is from 3.0 to 5.0 mass %; the content of Nb is from 4.5 to 5.5 mass %; the content of Ti is from 0.8 to 1.5 mass %; and the content of Fe is from 16 to 20 mass %.

(iii) Yield stress of the Ni-based forged alloy is 1000 MPa or more at 500° C., and the yield stress thereof is 300 MPa or less at 900° C.

(iv) The Ni-based forged alloy comprises a base phase including: crystal grains having an average size from 5 to 100 μm, one or more of the crystal grains including one or more carbide precipitates having an average size from 0.5 to 10 μm; and crystal grain boundaries, one or more of the crystal grain boundaries including one or more carbide precipitates having an average size from 0.5 to 10 μm.

(II) According to another aspect of the present invention, there is provided a gas turbine member weighing 5 tons or more formed using the above-described Ni-based forged alloy.

In the above aspect (II) of the invention, the following modifications and changes can be made.

(v) The gas turbine member is a turbine disk.

(vi) The gas turbine member is a turbine spacer.

(III) According to still another aspect of the present invention, there is provided a gas turbine with an output power of 80 MW or more, comprising the turbine disk and/or the turbine spacer.

ADVANTAGES OF THE INVENTION

According to the present invention, it is possible to provide an Ni-based forged alloy having high mechanical strength at high temperature as well as good hot formability and good large ingot formability (such that even large ingots can be formed without any segregation defects during the solidification). Also, it is possible to provide large gas turbine members (such as turbine disks and turbine spacers) formed using the above-mentioned Ni-based forged alloy of the invention. Further, it is possible to provide a high-efficiency gas turbine constructed using the above-mentioned large gas turbine members of the invention.

DETAILED DESCRIPTION OF THE PREFERRED EMBODIMENTS

Preferred embodiments of the present invention will be described below in detail with reference to the accompanying drawings. However, the invention is not limited to the specific embodiments described below, but various combinations and modifications are possible without departing from the spirit and scope of the invention.

In order to achieve the above-mentioned objectives, the inventors have intensively investigated and discussed influences of various alloying elements on segregation in Ni-based heat-resistant alloys using thermodynamic calculations and verification tests. The results showed that by selecting a proper composition range of alloying elements (in particular, by selecting the concentrations of Al, Ti, Nb and Mo so as to satisfy a particular compositional relationship), Ni-based heat-resistant alloys that are less susceptible to solidification segregation and have good hot forgeability plus high mechanical strength at high temperature can be obtained. The present invention is based on this new finding.

In order to improve large ingot formability, segregation during solidification (solidification segregation) needs to be suppressed. Solidification segregation is considered to be strongly influenced by a local melt density deviation (a local change in the density of an alloy melt). The melt density deviation of an alloy melt is defined as a difference between the density of the alloy melt before solidification starts and the local melt density near a solid/liquid interface during solidification changed by distribution (redistribution) of the solute elements of the alloy. The larger the melt density deviation, the more strongly segregation is prone to occur.

Figure 1:
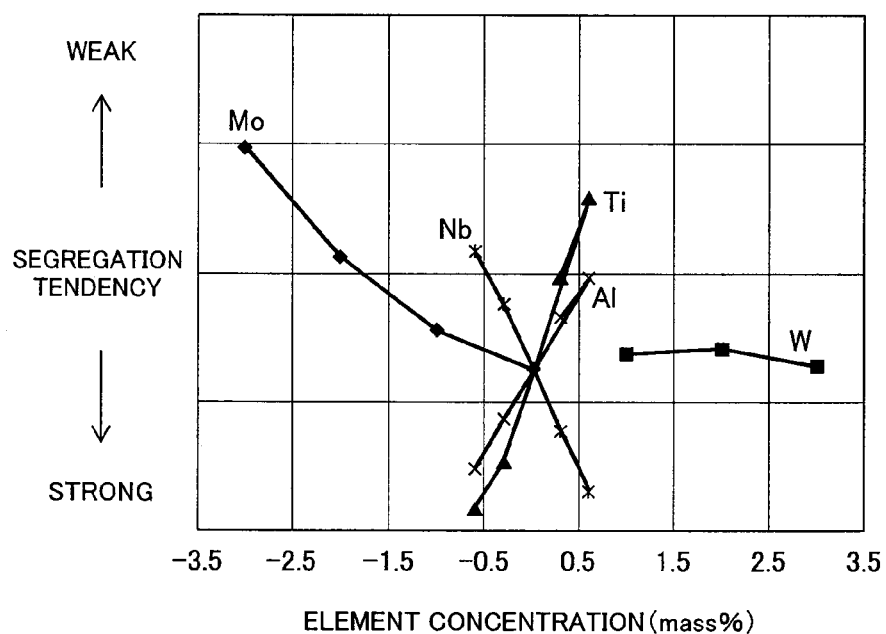
FIG. 1 is a graph showing a relationship between alloying element concentration and segregation tendency.

FIG. 1 is a graph showing a relationship between alloying element concentration and segregation tendency. FIG. 1 shows, for various Ni-based alloys having almost the same composition as alloy 718 (widely used as an Ni-based heat-resistant alloy), change of the segregation tendency as a function of the deviation from the standard concentrations of the alloying elements of alloy 718. In FIG. 1, lower values on the ordinate represent stronger segregation tendency, meaning that it is more difficult to form large-size members.

As shown in FIG. 1, as the concentration of elements (such as Mo and Nb) having a higher atomic weight (thus heavier) than Ni is decreased, the melt density deviation decreases and thus solidification segregation becomes suppressed to a smaller level. By contrast, as the concentration of elements (such as Al and Ti) having a lower atomic weight (thus lighter) than Ni is increased, the melt density deviation decreases and thus solidification segregation is suppressed to a smaller level. On the other hand, the concentration of elements such as Cr, W and Fe has almost no influence on the segregation tendency. Hence, for an Ni-based alloy, by properly balancing the concentrations of the elements (Mo, Nb, Al and Ti) having different segregation tendencies, the precipitation strengthening phase of the alloy can be stabilized while suppressing solidification segregation by controlling the melt density deviation. Thus, improvement in large ingot formability and increase in mechanical strength at high temperature can be both achieved.

More specifically, segregation parameter Ps (a parameter which indicates segregation tendency) defined by a formula of "Ps (mass %)=1.05×[Al concentration (mass %)]+0.6×[Ti concentration (mass %)]−0.8×[Nb concentration (mass %)]−0.3×[Mo concentration (mass %)]", is preferably −3.0 mass % or more (i.e., Ps≥−3.0 mass %). By selecting the concentrations of these alloying elements so as to fall within the range "Ps≥−3.0 mass %", the formation of large ingots without any segregation defects, a primary objective of the invention, can be achieved. As defined above, Ps is a function of the concentrations of the above alloying elements. So, the maximum Ps value simply calculated from each of the element concentration ranges described later becomes "0.58". However, from a viewpoint of the balance between hot formability and high-temperature mechanical strength, the more preferred Ps range is "−1.0≥Ps≥−2.9".

Next, the preferred compositional range of the Ni-based forged alloy of the present invention and the reason for the preference will be described.

Carbon (C) forms a solid solution with the base phase of an Ni-based alloy, thereby increasing a tensile strength at a high temperature. Carbon also forms carbides (such as MC and $M_{23}C_6$ where M is a metal element), thereby increasing a grain boundary strength of the base phase. These effects are significant at about 0.001 mass % or more. However, excessive addition of C causes formation of coarse eutectic carbides and concentrated precipitation of carbides, thereby decreasing toughness. Therefore, the C content is preferably 0.1 mass % or less, and more preferably from 0.03 to 0.08 mass %.

Boron (B) strengthens the grain boundaries of the base phase even in a small amount, thus improving a creep strength of the base phase. However, excessive addition of B causes precipitation of undesirable phases or causes partial melting due to decrease in melting point. Therefore, the B content is preferably from 0.001 to 0.01 mass %, and more preferably from 0.003 to 0.008 mass %.

Iron (Fe) is more ductile than Ni, and therefore its addition improves hot formability. In addition, Fe is cheaper than other elements, resulting in low cost alloys. However, excessive addition of Fe destabilizes the γ' precipitation strengthening phase, thereby decreasing a high-temperature mechanical strength. Therefore, the Fe content is preferably from 16 to 20 mass %.

Chromium (Cr) forms a dense oxide (e.g., $Cr_2O_3$) film on a surface of an Ni-based alloy, thereby increasing an oxidation resistance and a high-temperature corrosion resistance of the alloy. The Cr content needs to be 16 mass % or more in order to use the Ni-based alloy for turbine members, which is one objective of the invention. However, addition of Cr in excess of 22 mass % causes precipitation of σ (sigma) phase, thereby degrading the ductility and fracture toughness of the resulting Ni-based alloy. Therefore, the Cr content is preferably from 16 to 22 mass %, and more preferably from 17 to 20 mass %.

Aluminum (Al) forms the γ' phase ($Ni_3Al$ phase), and is therefore an essential element for increasing a mechanical strength of the γ' phase strengthened Ni-based heat resistant alloys. The Al also increases an oxidation resistance. The Ni-based alloy of the invention also contains Ti and Nb, which are also mechanical strength enhancing elements, in relatively large amounts. Therefore, 0.5 mass % Al is sufficient for increasing the total mechanical strength of the resulting alloy. Lack of Al decreases the γ' phase precipitation induced by aging, and therefore does not provide sufficient high-temperature mechanical strength. However, excessive addition of Al accelerates the formation of hard and brittle undesirable phases, and therefore, the Al content should not exceed 1.5 mass %. More specifically, the Al content is preferably from 0.5 to 1.5 mass %, and more preferably from 0.6 to 1.3 mass %. In addition, at a solid/liquid interface of an Ni-based alloy during solidification, the Al is distributed (dissolves) more into the liquid phase of Ni than into the solid phase of Ni, and thereby the melt density deviation decreases. Thus, the Al has an effect of suppressing solidification segregation even within the above-described Al concentration range specified by the invention.

Titanium (Ti), as well as the Al, is another γ' phase precipitation strengthening element, thus contributing to improvement in the high-temperature mechanical strength. In addition, the Ti is distributed more into the liquid phase of Ni than into the solid phase during solidification and therefore decreases the melt density deviation. Thus, the Ti has the effect of suppressing solidification segregation. The Ti content in the Ni-based alloy of the invention needs to be 0.8 mass % or more in order to suppress solidification segregation. However, like the Al and Nb, excessive addition of Ti forms intermetallic compounds other than the γ' phase or increases a solid solution temperature of the γ' phase, thereby degrading the ductility and high-temperature formability of the resulting alloy. Therefore, the Ti content should not exceed 3.0 mass %. More specifically, the Ti content is preferably from 0.8 to 3.0 mass %, and more preferably from 0.8 to 1.5 mass %.

Niobium (Ni), as well as the Al and Ti, is another γ' phase precipitation strengthening element, thus improving the high-temperature mechanical strength. In addition, according to the invention, 3.5 mass % or more of Nb addition forms a γ" strengthening phase ($Ni_3Nb$ phase) having a crystal structure similar to that of the γ' phase, thereby strengthening the resulting alloy more effectively. However, excessive addition of Nb causes precipitation of deleterious phases. Furthermore, as described above, the segregation tendency of an Ni-based alloy increases with increasing Nb content, and therefore the Nb content should not exceed 5.5 mass %. In view of the large ingot formability and high-temperature mechanical strength, it is important to balance the concentrations of Al, Ti and Mo. In order to achieve this balance, the Nb content is preferably from 3.5 to 5.5 mass %, and more preferably from 4.5 to 5.5 mass %.

Tungsten (W) is a typical solid-solution strengthening element. Addition of W even in a small amount of 0.1 mass % is effective in strengthening the base phase. Unlike precipitation strengthening elements such as Al, Ti and Nb, W addition causes only a relatively small structural change in the base phase. However, addition of W in excess of 6.0 mass % promotes the formation of hard and brittle intermetallic compounds or degrades hot formability. In order to balance the solid-solution strengthening and hot formability, the W content is preferably from 0.1 to 6.0 mass %, and more preferably from 3.0 to 5.0 mass %.

Molybdenum (Mo), as well as the W, is another element that strengthens the base phase by solid-solution strengthening, and therefore may be added to the Ni-based alloy of the invention. Even 0.1 mass % of Mo addition is effective in increasing a mechanical strength, and this effect increases with increasing Mo concentration. However, as described above, an increase in Mo concentration increases the melt density deviation (i.e. segregation tendency) and also degrades the hot formability. Therefore, the Mo content should not exceed 2.0 mass %.

In order to improve hot formability (such as hot forgeability), the total content of Mo and W needs to satisfy a specific condition as described below. The hot forgeability of an Ni-based heat-resistant alloy may degrade for the following reason: Precipitation strengthening phases may remain precipitated (undissolved) in large amounts in the alloy up to a typical forging temperature of 900 to 1150° C., or the alloy may have a high deformation resistance due to a large amount of solid-solution strengthening elements present in the alloy. However, precipitation strengthening phases (γ' phase and γ" phase) of Al-, Ti- and Nb-compound have a solid solution temperature of about 900° C. in the above described invention's concentration ranges of Al, Ti and Nb. Therefore, these precipitation phases are not present at the above-mentioned forging temperatures, and thus has no adverse effect on hot forgeability. By contrast, unlike precipitation strengthening elements, solid-solution strengthening elements such as W and Mo maintain its effect up to high temperature, and therefore have strong influence on hot forgeability. Total W and Mo contents of more than 1.75 atomic % increase deformation resistance, thus degrading hot forgeability. In order to balance the mechanical strength and hot formability, the total content of W and Mo is preferably from 0.03 to 1.75 atomic %, and more preferably from 0.5 to 1.75 atomic %.

The Ni-based forged alloy of the present invention may contain one or more elements selected from Co, Mg, Ca, Zr, Mn, Si, V, Ta, and Re.

Cobalt (Co) improves a high-temperature ductility, and may be added in up to 5 mass %. Co contents of more than 5 mass % promotes precipitation of embrittling phases.

Magnesium (Mg) and/or calcium (Ca) may be added to reduce the amount of sulfur (S) which is a deleterious element present in the molten alloy. However, excessive addition of Mg or Ca forms inclusions, thereby decreasing the fatigue strength of the alloy. Therefore, the Mg content and the Ca content each should not exceed 0.1 mass %.

Zirconium (Zr) may be added in order to strengthen the grain boundaries of the base phase and improve the ductility of the resulting alloy. However, excessive addition of Zr causes partial melting, thereby degrading the hot formability. Therefore, the Zr content should not exceed 0.1 mass %.

Manganese (Mn) and silicon (Si) have a deoxidizing effect, and therefore may be added in order to reduce the concentration of oxygen (O) dissolved in the alloy. However, excessive addition of Mn or Si destabilizes the precipitation strengthening phases, thereby decreasing the high-temperature mechanical strength. Therefore, the Mn content and the Si content each should not exceed 0.5 mass %.

Vanadium (V) and tantalum (Ta) stabilize the γ' phase, and therefore may be added in order to increase the high-temperature mechanical strength. However, excessive addition of V or Ta degrades the hot formability or decreases the ductility of the resulting alloy. Therefore, the V content and the Ta content each should not exceed 0.5 mass %.

Rhenium (Re), as well as the Mo and W, strengthens the base phase, and therefore may be added in order to increase the high-temperature mechanical strength. However, excessive addition of Re degrades the hot formability. Therefore, the Re content should not exceed 0.5 mass %.

The Ni-based forged alloy of the invention contains unavoidable impurities besides the above-described elements. The unavoidable impurities refer to unavoidable elements contaminated during manufacture, such as ones originally contained in raw materials. Examples of unavoidable impurities are oxygen (O), nitrogen (N), sulfur (S) and phosphorus (P).

EXAMPLES

The present invention will be described in more detail below by way of examples. However, the invention is not limited to the specific examples below.

First, test alloy ingots (mass of 10 kg, diameter of 85 mm, length of 140 mm) were prepared using a vacuum induction melting furnace. The nominal composition of each test alloy is shown in Table 1. Inventive Example Nos. 1 to 20 were according to the invention, and Comparative Example Nos. 21 to 27 were not according to the invention. Comparative Example No. 21 corresponds to alloy 718.

Next, each cast test alloy ingot, after removing a surface oxide film and defects caused by the casting, was hot-forged into an Ni-based forged alloy round rod sample (15 mm in diameter). Then, each Ni-based forged alloy round rod sample was evaluated for the hot forgeability as follows: When a rod sample after the forging was free from any visible problems such as cracking, its hot forgeability was rated as "Passed". When a rod sample had visible cracks as small as 5 mm or less in size, its hot forgeability was rated as "Failed". When a rod sample had visible cracks as large as 5 mm or more in size, its hot forgeability was rated as "Bad". The results are shown in Table 2.

Then, a tensile test piece was cut out from each Ni-based forged alloy round rod sample and was then evaluated for the mechanical characteristics by high-temperature tensile test at 500° C. and 900° C. The results are also shown in Table 2.

In addition to the above-described test alloy ingots, segregation-test alloy ingots were prepared by using a simulated condition of an actual manufacturing condition (such as cooling rate and temperature gradient across solidification interface) of 5-ton class large alloy ingots. Each segregation-test alloy ingot was evaluated for the segregation tendency by observation of presence or absence of the solidification segregates. A segregation-test alloy ingot in which no freckle defects were observed was rated as "Passed". A segregation-test alloy ingot in which any freckle defects were observed was rated as "Failed". The results are also shown in Table 2.

TABLE 1

| | | Composition of Example Alloy | | | | | | |
|---|---|---|---|---|---|---|---|---|
| | | Type Inventive Example | | | | | | |
| | No. | 1 | 2 | 3 | 4 | 5 | 6 | 7 |
| Alloy Composition (mass %) | Ni | Balance | Balance | Balance | Balance | Balance | Balance | Balance |
| | C | 0.03 | 0.03 | 0.03 | 0.03 | 0.03 | 0.08 | 0.08 |
| | B | 0.004 | 0.004 | 0.004 | 0.007 | 0.007 | 0.004 | 0.004 |
| | Cr | 19 | 18 | 18 | 19.5 | 19.5 | 18 | 18 |
| | Al | 0.6 | 0.8 | 1.0 | 0.6 | 0.6 | 0.8 | 0.6 |
| | Mo | — | — | — | — | — | — | — |
| | W | 4.0 | 4.5 | 5.0 | 4.0 | 3.0 | 2.0 | 4.0 |
| | Nb | 5.15 | 5.15 | 5.15 | 5.2 | 5.2 | 4.7 | 4.5 |
| | Ti | 0.9 | 0.9 | 0.9 | 1.1 | 1.2 | 1.5 | 2.4 |
| | Fe | 18.5 | 18.5 | 17.0 | 17.0 | 20.0 | 20.0 | 17.5 |
| | Other | — | — | — | — | — | — | — |

TABLE 1-continued

Composition of Example Alloy

| Ps | −2.95 | −2.74 | −2.53 | −2.90 | −2.81 | −2.02 | −1.53 |
|---|---|---|---|---|---|---|---|
| Mo + W (at. %) | 1.28 | 1.44 | 1.61 | 1.28 | 0.95 | 0.63 | 1.27 |

| | | Type Inventive Example | | | | | | |
|---|---|---|---|---|---|---|---|---|
| | No. | 8 | 9 | 10 | 11 | 12 | 13 | 14 |
| Alloy Composition (mass %) | Ni | Balance | Balance | Balance | Balance | Balance | Balance | Balance |
| | C | 0.08 | 0.10 | 0.001 | 0.03 | 0.03 | 0.03 | 0.03 |
| | B | 0.004 | 0.001 | 0.001 | 0.004 | 0.004 | 0.004 | 0.004 |
| | Cr | 19 | 21.5 | 16.5 | 19 | 19 | 19 | 19 |
| | Al | 1.5 | 0.8 | 0.8 | 0.6 | 0.8 | 0.6 | 0.6 |
| | Mo | — | — | — | 1.0 | 1.5 | — | — |
| | W | 4.0 | 3.5 | 3.5 | 3.0 | 2.5 | 4.5 | 4.5 |
| | Nb | 5.0 | 4.5 | 4.5 | 5.0 | 5.0 | 5.15 | 5.15 |
| | Ti | 0.9 | 0.8 | 0.8 | 1.2 | 1.2 | 1.2 | 1.2 |
| | Fe | 18.5 | 16.0 | 16.0 | 18.5 | 18.5 | 18.5 | 18.5 |
| | Other | — | — | — | — | — | 3Co | 0.05Mg |
| Ps | | −1.89 | −2.28 | −2.28 | −2.95 | −2.89 | −2.77 | −2.77 |
| Mo + W (at. %) | | 1.26 | 1.11 | 1.12 | 1.57 | 1.71 | 1.44 | 1.44 |

| | | Type Inventive Example | | | | | |
|---|---|---|---|---|---|---|---|
| | No. | 15 | 16 | 17 | 18 | 19 | 20 |
| Alloy Composition (mass %) | Ni | Balance | Balance | Balance | Balance | Balance | Balance |
| | C | 0.03 | 0.03 | 0.03 | 0.03 | 0.03 | 0.03 |
| | B | 0.004 | 0.004 | 0.004 | 0.004 | 0.004 | 0.004 |
| | Cr | 19 | 19 | 19 | 19 | 19 | 19 |
| | Al | 0.6 | 0.6 | 0.6 | 0.6 | 0.6 | 0.6 |
| | Mo | — | — | — | — | — | — |
| | W | 4.5 | 4.5 | 4.5 | 4.5 | 4.5 | 4.5 |
| | Nb | 5.15 | 5.15 | 5.15 | 5.15 | 5.15 | 5.15 |
| | Ti | 1.2 | 1.2 | 1.2 | 1.2 | 1.2 | 1.2 |
| | Fe | 18.5 | 18.5 | 18.5 | 18.5 | 18.5 | 18.5 |
| | Other | 0.05Ca | 0.05Zr | 0.2Mn | — | 0.3Ta 0.2V | 0.2Re |
| Ps | | −2.77 | −2.77 | −2.77 | −2.77 | −2.77 | −2.77 |
| Mo + W (at. %) | | 1.44 | 1.44 | 1.44 | 1.44 | 1.45 | 1.45 |

| | | Type Comparative Example | | | | | | |
|---|---|---|---|---|---|---|---|---|
| | No. | 21 | 22 | 23 | 24 | 25 | 26 | 27 |
| Alloy Composition (mass %) | Ni | Balance | Balance | Balance | Balance | Balance | Balance | Balance |
| | C | 0.03 | 0.03 | 0.03 | 0.03 | 0.03 | 0.03 | 0.03 |
| | B | 0.004 | 0.004 | 0.004 | 0.004 | 0.004 | 0.004 | 0.004 |
| | Cr | 19 | 19 | 19 | 18.7 | 18.8 | 18.7 | 18.7 |
| | Al | 0.2 | 0.6 | 0.6 | 0.6 | 0.2 | 2.0 | 1.0 |
| | Mo | 3.0 | — | 3.0 | — | — | — | 1.0 |
| | W | — | 3.0 | 1.5 | 8.0 | 3.0 | 4.5 | 4.5 |
| | Nb | 5.15 | 6.0 | 5.5 | 5.15 | 2.0 | 5.15 | 5.15 |
| | Ti | 0.9 | 1.2 | 0.9 | 1.5 | 0.5 | 2.0 | 1.2 |
| | Fe | 18.5 | 18.5 | 18.5 | 18.6 | 18.5 | 18.5 | 18.5 |
| | Other | — | — | — | — | — | — | — |
| Ps | | −4.27 | −3.45 | −4.13 | −2.59 | −1.09 | −0.82 | −2.65 |
| Mo + W (at. %) | | 1.82 | 0.96 | 2.53 | 2.40 | 0.95 | 1.42 | 2.06 |

TABLE 2

Test and Evaluation Results

| Type | No. | 0.2% Proof Stress (MPa) 500° C. | 0.2% Proof Stress (MPa) 900° C. | Solidification Segregation | Hot Forgeability |
|---|---|---|---|---|---|
| Inventive Example | 1 | 1020 | 285 | Passed | Passed |
| | 2 | 1037 | 267 | Passed | Passed |
| | 3 | 1080 | 284 | Passed | Passed |
| | 4 | 1120 | 271 | Passed | Passed |
| | 5 | 1143 | 285 | Passed | Passed |
| | 6 | 1025 | 272 | Passed | Passed |
| | 7 | 1108 | 287 | Passed | Passed |
| | 8 | 1095 | 292 | Passed | Passed |
| | 9 | 1054 | 254 | Passed | Passed |
| | 10 | 1032 | 262 | Passed | Passed |

TABLE 2-continued

Test and Evaluation Results

| Type | No. | 0.2% Proof Stress (MPa) 500° C. | 0.2% Proof Stress (MPa) 900° C. | Solidification Segregation | Hot Forgeability |
|---|---|---|---|---|---|
| | 11 | 1044 | 267 | Passed | Passed |
| | 12 | 1109 | 263 | Passed | Passed |
| | 13 | 1067 | 275 | Passed | Passed |
| | 14 | 1028 | 270 | Passed | Passed |
| | 15 | 1061 | 260 | Passed | Passed |
| | 16 | 1038 | 275 | Passed | Passed |
| | 17 | 1022 | 268 | Passed | Passed |
| | 18 | 1072 | 273 | Passed | Passed |
| | 19 | 1085 | 259 | Passed | Passed |
| | 20 | 1063 | 267 | Passed | Passed |
| Comparative Example | 21 | 1025 | 281 | Failed | Passed |
| | 22 | 1087 | 286 | Failed | Failed |
| | 23 | 1174 | 295 | Failed | Failed |
| | 24 | 1203 | 335 | Passed | Bad |
| | 25 | 876 | 158 | Passed | Passed |
| | 26 | 1046 | 328 | Passed | Bad |
| | 27 | 1055 | 359 | Passed | Failed |

All the Inventive Example alloys had almost similar mechanical characteristics at both 500° C. and 900° C., which were comparable to those of alloy 718 (corresponding to Comparative Example No. 21) widely used as a high-strength heat-resistant material. More specifically, the Inventive Example alloys had a high mechanical strength of 1000 MPa or more at 500° C., a temperature representative of actual use temperatures. At 900° C., which is roughly the lowest actual forging temperature, the Inventive Example alloys had a mechanical strength as low as 300 MPa or less, meaning that these alloys had sufficiently low deformation resistance. Also, the hot forgeability of these alloys was rated as "Passed".

Figure 2:
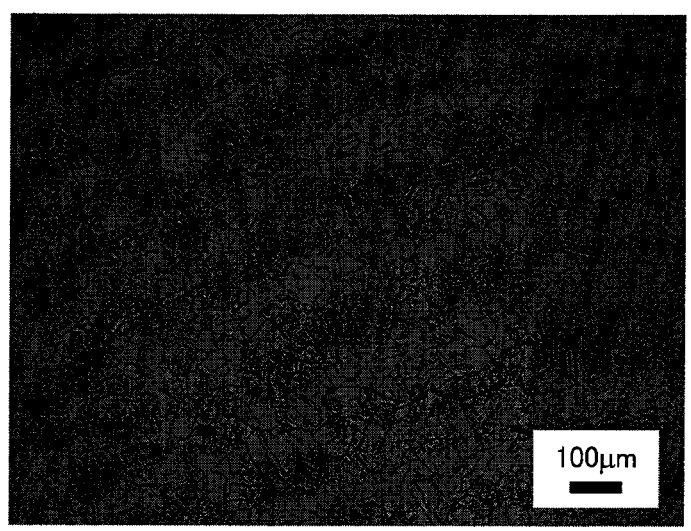
FIG. 2 is a photomicrograph showing a microstructure of Inventive Example No. 1 alloy.

FIG. 2 is a photomicrograph showing a microstructure of Inventive Example No. 1 alloy. As shown in FIG. 2, the base phase had a typical forged alloy microstructure consisting of crystal grains having an average grain size of about 50 μm. Carbide precipitates of about 1 to 5 μm in size were present both along the grain boundaries of the base phase and within the grains.

The crystal grain size of the base phase and the carbide precipitate size vary depending on the heat treatment condition (temperature and time). In order to obtain good mechanical characteristics, average grain size of the base phase is preferably from 5 to 100 μm. Average base phase grain sizes of larger than 100 μm decrease the fatigue strength and ductility. On the other hand, average base phase grain sizes of smaller than 5 μm decrease the creep strength.

Average size of the carbide precipitates is preferably from 0.5 to 10 μm. Carbide precipitates strengthen the grain boundaries of the base phase, and the smaller the precipitate size, the stronger the strengthening effect. However, average carbide precipitate sizes of smaller than 0.5 μm tend to coarse the carbide precipitates and may induce a microstructural change in the alloy during high-temperature use. On the other hand, average carbide precipitate sizes of larger than 10 μm may decrease the ductility. The other Inventive Example alloys (Nos. 2 to 20) all had a microstructure similar to that shown in FIG. 2, and their base phase grain size and carbide precipitate size fell respectively within the above-mentioned preferred ranges.

As described above, the segregation test was performed at a condition simulating an actual cooling condition used to form 5-ton class large alloy ingots. All the Inventive Example alloys had no solidification segregation. Therefore, these inventive alloys can be used to form large-size forged members as heavy as from about 5 to about 7 ton.

The 0.2% proof stress at 500° C. of Comparative Example No. 25 was lower than those of the other Inventive Example and Comparative Example alloys. Probably, in this alloy, the addition of precipitation strengthening elements (Al and Nb) was too small, resulting in insufficient precipitation strengthening. Comparative Example No. 26 had a relatively high 0.2% proof stress (higher than 300 MPa) at 900° C., and suffered from large cracks during the hot forging. This is because this alloy contained a relatively large amount of Al, and, as a result, the Al-compound precipitation strengthening phase still remained at 900° C.

Comparative Example Nos. 24 and 27 contained a total Mo and W content of more than 1.75 atomic %, and therefore probably had a strong solid-solution strengthening effect. As a result, these alloys had a 0.2% proof stress of more than 300 MPa (i.e., high deformation resistance) at 900° C., and suffered from large cracks during the hot forging. Generally, the forging condition of large-size members is relatively severe. So, Comparative Example Nos. 24 and 27 probably cannot be used to forge large-size gas turbine members.

Comparative Example Nos. 21, 22 and 23 suffered from macro segregation (freckle defect) at the segregation test, and thus were far inferior to the Inventive Example alloys in terms of large ingot formability. In these ingots which suffered from macro segregation, the chemical composition (i.e. microstructure) was not uniform throughout the entire volume of the ingot, and thus the mechanical characteristics of the ingot greatly varied from one portion to another. This nonuniformity seriously degraded the formability (forgeability) of the ingot and the mechanical strength of the resulting forged members. Thus, the alloys of Comparative Example Nos. 21 to 23 probably cannot be used to form large-size ingots of 5-ton class.

All the Inventive Example alloys had a segregation parameter Ps of −3.0 or more (Ps≥−3.0). On the other hand, the alloys of Comparative Example Nos. 21 to 23 had a segregation parameter Ps of less than −3.0 (Ps<−3.0), and suffered from the solidification segregation. However, the Comparative Example alloys having a segregation parameter Ps of −3.0 or more (Ps≥−3.0) did not suffer from the solidification segregation, although they were inferior to all of the Inventive Example alloys in terms of the high-temperature mechanical strength and hot forgeability. This result demonstrates that the condition of "Ps≥−3.0" is a good guideline for controlling the solidification segregation.

As described above, according to the invention, by properly controlling the concentrations of alloying elements (in particular, elements which tend to induce segregation), large-size alloy ingots having excellent high-temperature mechanical characteristics comparable to those of alloy 718 can be formed without any solidification segregation.

As a method for forming the Ni-based forged alloy of the invention, though there is no particular limitation thereon, for example, a double melt process (VIM [Vacuum Induction Melting] followed by ESR [Electroslag Remelting] or VAR [Vacuum Arc Remelting]) or a triple melt process (VIM followed by ESR plus VAR) may be used. Using such a process, a large alloy ingot having a diameter as large as about 1000 mm can be formed without macro segregation, and large members as heavy as more than 5 tons can be hot-forged from this large alloy ingot.

Next, examples of gas turbine members forged from the Ni-based alloy of the invention will be briefly described.

Figure 3:
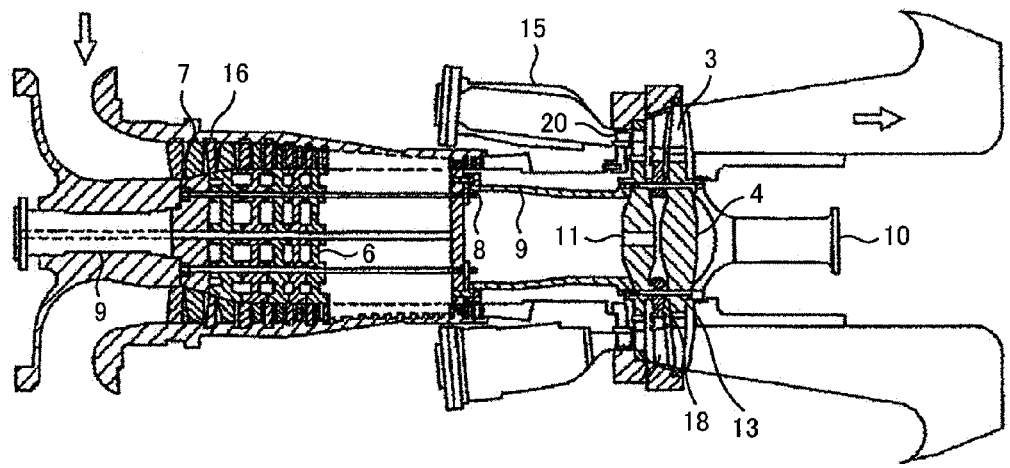
FIG. 3 is a schematic illustration showing a longitudinal sectional view of an example of a gas turbine.
Figure 4:
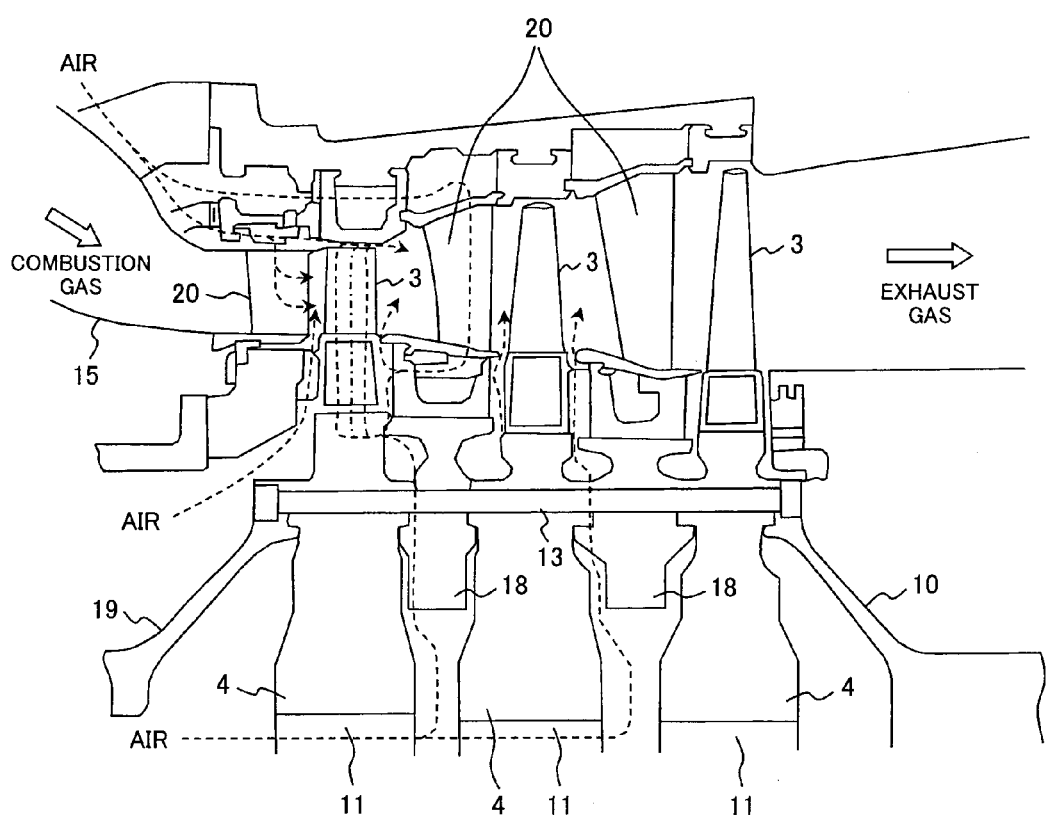
FIG. 4 is a schematic illustration showing an enlarged longitudinal sectional view of a rotating turbine section of a gas turbine.

FIG. 3 is a schematic illustration showing a longitudinal sectional view of an example of a gas turbine. FIG. 4 is a schematic illustration showing an enlarged longitudinal sectional view of a rotating turbine section of a gas turbine. In FIGS. 3 and 4, reference numeral 3 designates a turbine blade, numeral 4 designates a turbine disk, numeral 6 designates a compressor disk, numeral 7 designates a compressor blade, numeral 8 designates a compressor stacking bolt, numeral 9 designates a compressor stub shaft, numeral 10 designates a turbine stub shaft, numeral 11 designates a vent, numeral 13 designates a turbine stacking bolt, numeral 15 designates a combustor, numeral 16 designates a compressor nozzle, numeral 18 designates a turbine spacer, numeral 19 designates a distance piece, and numeral 20 designates a nozzle.

A gas turbine essentially includes a compressor, a combustor and a turbine. The compressor compresses air, which is then mixed with a fuel and combusted in the combustor 15 to generate a high-temperature, high-pressure combustion gas. The combustion gas impinges onto the turbine blades 3 to rotate the turbine. The rotating turbine section, through which the high-speed combustion gas flows, includes alternate turbine blades 3 and nozzles 20. The turbine blades 3 are mounted on each turbine disc 4 fixed to the turbine rotation axis. The turbine discs 4 are stacked together by means of the turbine spacers 18 and the turbine stacking bolts 13.

Of these gas turbine members, for example the turbine disk 4 and the turbine spacer 18 require high-temperature mechanical strength and are preferably forged from an alloy. Conventional high-temperature materials such as alloy 718 have poor large ingot formability, and it has thus been difficult to produce large forged members for high temperature use (such as large forged turbine disks). So, conventionally, materials having large ingot formability but for relatively low temperature use have been often employed to manufacture large forged members of gas turbines. That is, this problem has been a bottleneck in achieving higher efficiency gas turbines.

The Ni-based alloy of the invention can be formed into large alloy ingots and such an alloy ingot can be forged into large-size high-temperature turbine members such as turbine disks and turbine spacers. By using such large-size high-temperature turbine members, gas turbines with an output power as high as 80 MW or more can be manufactured. Thus, high-efficiency thermal power plants can be constructed using such large gas turbines.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An Ni-based forged alloy comprising: 0.001 to 0.1 mass % of C; 0.001 to 0.01 mass % of B; 16 to 22 mass % of Cr; 0.5 to 1.5 mass % of Al; 0.1 to 6.0 mass % of W; 3.5 to 5.5 mass % of Nb; 0.8 to 3.0 mass % of Ti; 16 to 20 mass % of Fe; 2.0 mass % or less of Mo; and the balance including Ni and unavoidable impurities, wherein:
    a segregation parameter Ps defined by a formula of "Ps (mass %)=1.05×[Al concentration (mass %)]+0.6×[Ti concentration (mass %)]−0.8×[Nb concentration (mass %)]−0.3×[Mo concentration (mass %)]" satisfies a relationship of "Ps−3.0 mass %"; and
    a total amount of W and Mo is 1.75 atomic % or less.

2. The Ni-based forged alloy according to claim 1, further comprising at least one additional element selected from the group consisting of 5 mass % or less of Co, 0.1 mass % or less of Mg, 0.1 mass % or less of Ca, 0.1 mass % or less of Zr, 0.5 mass % or less of Mn, 0.5 mass % or less of Si, 0.5 mass % or less of V, 0.5 mass % or less of Ta, and 0.5 mass % or less of Re.

3. The Ni-based forged alloy according to claim 1, wherein the content of C is from 0.03 to 0.08 mass %; the content of B is from 0.003 to 0.008 mass %; the content of Cr is from 18 to 20 mass %; the content of Al is from 0.6 to 1.3 mass %; the content of W is from 3.0 to 5.0 mass %; the content of Nb is from 4.5 to 5.5 mass %; the content of Ti is from 0.8 to 1.5 mass %; and the content of Fe is from 16 to 20 mass %.

4. The Ni-based forged alloy according to claim 1, wherein yield stress of the Ni-based forged alloy is 1000 MPa or more at 500° C. and is 300 MPa or less at 900° C.

5. The Ni-based forged alloy according to claim 1, comprising a base phase including:
    crystal grains having an average size from 5 to 100 μm, one or more of the crystal grains including one or more carbide precipitates having an average size from 0.5 to 10 μm; and
    crystal grain boundaries, one or more of the crystal grain boundaries including one or more carbide precipitates having an average size from 0.5 to 10 μm.

6. A gas turbine member weighing 5 tons or more formed using the Ni-based forged alloy according to claim 1.

7. The gas turbine member according to claim 6, wherein the gas turbine member is a turbine disk.

8. A gas turbine, comprising the turbine disk according to claim 7 and having an output power of 80 MW or more.

9. The gas turbine member according to claim 6, wherein the gas turbine member is a turbine spacer.

10. A gas turbine, comprising the turbine spacer according to claim 9 and having an output power of 80 MW or more.

* * * * *